United States Patent
Sachan (10) Patent No.: US 9,278,699 B2
(45) Date of Patent: Mar. 8, 2016

(54) LATERAL SUPPORT ELEMENTS, GAS SPRING ASSEMBLIES AND METHODS

(71) Applicant: Firestone Industrial Products Company, LLC, Indianapolis, IN (US)

(72) Inventor: Naveen S. Sachan, Jhansi (IN)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/150,093

(22) Filed: Jan. 8, 2014

(65) Prior Publication Data

US 2014/0191487 A1    Jul. 10, 2014

Related U.S. Application Data

(60) Provisional application No. 61/750,035, filed on Jan. 8, 2013.

(51) Int. Cl.
| | |
|---|---|
| *B60G 11/27* | (2006.01) |
| *B60G 11/28* | (2006.01) |
| *B61F 5/10* | (2006.01) |
| *B61F 5/30* | (2006.01) |
| *F16F 9/04* | (2006.01) |

(52) U.S. Cl.
CPC ............... *B61F 5/307* (2013.01); *B60G 11/27* (2013.01); *B60G 11/28* (2013.01); *B61F 5/10* (2013.01); *F16F 9/0454* (2013.01); *B60G 2202/152* (2013.01); *B60G 2204/126* (2013.01); *B60G 2206/91* (2013.01); *B60G 2300/10* (2013.01); *Y10T 29/49611* (2015.01)

(58) Field of Classification Search
CPC .. B60G 11/28; B60G 11/27; B60G 2204/126; B60G 2202/152; B61F 5/10; B61F 5/307; F16F 9/0445; F16F 9/0454; F16F 9/052

USPC ....................... 280/124.157, 124.16, 124.162
See application file for complete search history.

(56) References Cited

U.S. PATENT DOCUMENTS

| | | | | |
|---|---|---|---|---|
| 2,537,637 | A * | 1/1951 | Candlin, Jr. et al. | 267/64.23 |
| 2,909,244 | A * | 10/1959 | Kraft | 188/29 |
| 2,951,455 | A * | 9/1960 | Candlin, Jr. | 105/453 |
| 2,954,745 | A * | 10/1960 | Lich | 105/4.4 |
| 2,960,333 | A * | 11/1960 | McGavern, Jr. et al. | 267/64.24 |
| 2,999,681 | A * | 9/1961 | Muller et al. | 267/64.27 |
| 3,043,582 | A * | 7/1962 | Hirtreiter | 267/64.24 |
| 3,682,464 | A * | 8/1972 | Krejcir | 267/64.24 |
| 3,826,507 | A * | 7/1974 | Brand et al. | 267/3 |
| 3,895,787 | A * | 7/1975 | Niehus | B61F 5/10 105/198.1 |

(Continued)

*Primary Examiner* — Barry Gooden, Jr.
(74) *Attorney, Agent, or Firm* — Jason A. Houser; Fay Sharpe LLP (57) ABSTRACT

Lateral support elements for engaging an associated flexible wall of an associated gas spring assembly can be displaceably mounted along an associated end member of the associated gas spring assembly, such as by way of an elastomeric mounting element. The elastomeric mounting element can be formed as an endless annular ring, from an elongated length of elastomeric material wound helically about an axis, a plurality of support element sections disposed in peripherally spaced relation to one another about an axis or from a plurality of concentric element rings formed from elastomeric and comparatively rigid materials. Gas spring assemblies including one or more of such lateral support element as well as suspension systems that includes one or more of such gas spring assemblies and methods of manufacture are also included.

20 Claims, 9 Drawing Sheets

(56) References Cited

U.S. PATENT DOCUMENTS

| | | | |
|---|---|---|---|
| 3,904,181 A * | 9/1975 | Harsy-Vadas | B60G 11/30 267/3 |
| 4,690,388 A * | 9/1987 | Harrison | 267/35 |
| 4,718,351 A * | 1/1988 | Engle | 105/4.3 |
| 4,883,000 A * | 11/1989 | Engle | 105/4.4 |
| 5,603,387 A * | 2/1997 | Beard et al. | 180/89.12 |
| 6,257,561 B1 * | 7/2001 | Nakayama et al. | 267/64.19 |
| 6,290,244 B1 * | 9/2001 | Hosoya | B60G 11/28 280/124.517 |
| 6,345,813 B1 * | 2/2002 | Trowbridge | F16F 9/0445 267/64.24 |
| 6,651,995 B1 * | 11/2003 | Buttner | 280/124.157 |
| 7,328,887 B2 * | 2/2008 | Leonard | 267/122 |
| 2003/0085536 A1 * | 5/2003 | Lang et al. | 280/6.15 |
| 2004/0012131 A1 * | 1/2004 | Bank et al. | 267/64.21 |
| 2004/0113335 A1 * | 6/2004 | Tubbs | 267/34 |
| 2005/0093260 A1 * | 5/2005 | Trescott | 280/86.5 |
| 2008/0296816 A1 * | 12/2008 | Tanaka et al. | 267/122 |
| 2010/0252970 A1 * | 10/2010 | Leonard | B60G 11/28 267/64.21 |
| 2011/0233832 A1 * | 9/2011 | Sawa | B61F 5/10 267/3 |
| 2013/0313764 A1 * | 11/2013 | Fujimoto | B61F 5/02 267/64.27 |
| 2013/0319284 A1 * | 12/2013 | Shinmura et al. | 105/453 |
| 2014/0091548 A1 * | 4/2014 | Ratz et al. | 280/124.157 |
| 2014/0210170 A1 * | 7/2014 | Dehlwes | F16F 9/052 280/6.15 |
| 2014/0230687 A1 * | 8/2014 | Jackson, Jr. | B61F 5/10 105/198.1 |
| 2014/0300038 A1 * | 10/2014 | Kita | B61F 5/02 267/122 |
| 2015/0165853 A1 * | 6/2015 | Smith | B60G 11/62 105/453 |

* cited by examiner

LATERAL SUPPORT ELEMENTS, GAS SPRING ASSEMBLIES AND METHODS

This application claims the benefit of U.S. Provisional Patent Application No. 61/750,035, filed on Jan. 8, 2013, the contents of which is hereby incorporated herein by reference in its entirety.

BACKGROUND

The subject matter of the present disclosure broadly relates to the art of spring devices and, more particularly, to displaceably-mounted lateral support elements for engaging a flexible wall of a gas spring assembly. Gas spring assemblies including one or more of such lateral support element as well as suspension systems that includes one or more of such gas spring assemblies and methods of manufacture are also included.

The subject matter of the present disclosure is capable of broad application and use in connection with a variety of applications and/or environments. For example, the subject matter of the present disclosure could be used in connection with gas spring assemblies of non-wheeled vehicles, support structures, height adjusting systems and actuators associated with industrial machinery, components thereof and/or other such equipment. In some cases, the subject matter of the present disclosure may find particular application and use in conjunction with wheeled vehicles (e.g., rail vehicles), and will be described herein with particular reference thereto. However, it is to be appreciated that the subject matter of the present disclosure is amenable to use in other applications and environments, and that the specific uses shown and described herein are merely exemplary. Accordingly, the subject matter of the present disclosure is not intended to be limited to use associated with gas spring suspension systems of wheeled vehicles.

A suspension system, such as may be used in connection with motorized rail vehicles and/or rolling-stock rail vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Generally, vehicle performance characteristics, such as ride quality and comfort, are commonly identified as being related to factors, such as spring rate, that are acting in an approximately axial direction in relation to the gas spring assemblies. It has been recognized, however, that relative movement in the lateral direction (i.e., a direction transverse to the axes of the gas spring assemblies) can also influence vehicle performance characteristics, such as ride quality and comfort, for example. In some cases, such lateral movement can include movement of the opposing end members of a gas spring assembly relative to one another in a direction transverse (e.g., perpendicular) to the axis of the gas spring assembly that is formed between the opposing end members.

Known gas spring assemblies sometimes include a flexible wall and a lateral support element that engages the flexible wall to influence the lateral stiffness rate of the gas spring assemblies. In some cases, known lateral support element designs can result in a lower lateral stiffness rate that can permit excessive lateral deflection of the end members relative to one another. While such performance conditions may, in some cases, result in favorable ride quality and comfort, performance characteristics such as vehicle handling and control can be undesirably affected. In other cases, known lateral support element designs can result in higher lateral stiffness rates that can provide favorable vehicle handling and control. However, such high lateral stiffness rates can also generate undesired performance characteristics, such as lower ride quality and/or comfort.

Notwithstanding the broad usage and overall success of the wide variety of gas spring assemblies including lateral support elements that are known in the art, it is believed that a need exists to meet the competing goals and/or to overcome other disadvantages of known constructions while still retaining comparable or improved performance, ease of manufacture, ease of assembly, ease of installation and/or reduced cost of manufacture. Thus, it is believed to be generally desirable to develop new constructions and/or designs that may advance the art of gas spring devices.

BRIEF SUMMARY

One example of a lateral support element and elastomeric support element assembly in accordance with the subject matter of the present disclosure can be dimensioned for use with an associated gas spring assembly. The lateral support element can include a support surface dimensioned to abuttingly engage an associated outer surface of an associated flexible sleeve of the associated gas spring assembly. An elastomeric support element that is at least partially formed from an elastomeric material can be operatively attached to the lateral support element. The elastomeric support element can be dimensioned to operatively secure the lateral support element on or along an associated end member of the associated gas spring assembly. During use, the lateral support element can be displaceably supported along the associated flexible wall such that forces generated during lateral displacement of the associated flexible sleeve and the associated end member relative to an associated second end of the associated flexible sleeve can induce lateral movement of the lateral support element relative to at least the associated end member.

One example of a gas spring assembly in accordance with the subject matter of the present disclosure can include a flexible sleeve having a longitudinal axis. The flexible sleeve can extend peripherally about the longitudinal axis between a first end and a second end that is spaced axially from the first end. The flexible sleeve can include an outer surface and an inner surface that at least partially defines a spring chamber. An end member can be disposed across the first end of the flexible sleeve and can be operatively secured thereto such that a substantially fluid-tight seal is formed with the end member along the first end of the flexible sleeve. A lateral support element can be disposed along the first end of the flexible sleeve adjacent the end member. The lateral support element can include a support surface dimensioned to abuttingly engage the outer surface of the flexible sleeve. The lateral support element can be displaceably supported along the first end of the flexible wall such that forces generated during lateral displacement of the first end of the flexible sleeve and the end member relative to the second end of the flexible sleeve can induce lateral movement of the lateral support element relative to the end member in a direction transverse to the longitudinal axis. In some cases, the gas spring assembly can also include an elastomeric support element that is at least partially formed from an elastomeric material. The elastomeric support element can be disposed between and operatively attach the lateral support element and the end member to one another.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source through the control device.

One example of a method of manufacture in accordance with the subject matter of the present disclosure can include providing a flexible sleeve having a longitudinal axis. The flexible sleeve can extend peripherally about the longitudinal axis between a first end and a second end spaced axially from the first end. The flexible sleeve can include an outer surface and an inner surface that is capable of at least partially defining a spring chamber. The method can also include providing an end member and positioning the end member across the first end of the flexible sleeve. The method can further include forming a substantially fluid-tight seal between the end member and the flexible sleeve. The method can also include providing a lateral support element including a support surface dimensioned to abuttingly engage the outer surface of the flexible sleeve. The method can further include supporting the lateral support element along the first end of the flexible sleeve such that forces generated during lateral displacement of the first end of the flexible sleeve and the end member relative to the second end of the flexible sleeve can induce lateral movement of the lateral support element relative to the end member in a direction transverse to the longitudinal axis. In some cases, the method can also include providing an elastomeric support element that is at least partially formed from an elastomeric material, and attaching the lateral support element to the end member using the elastomeric support element.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
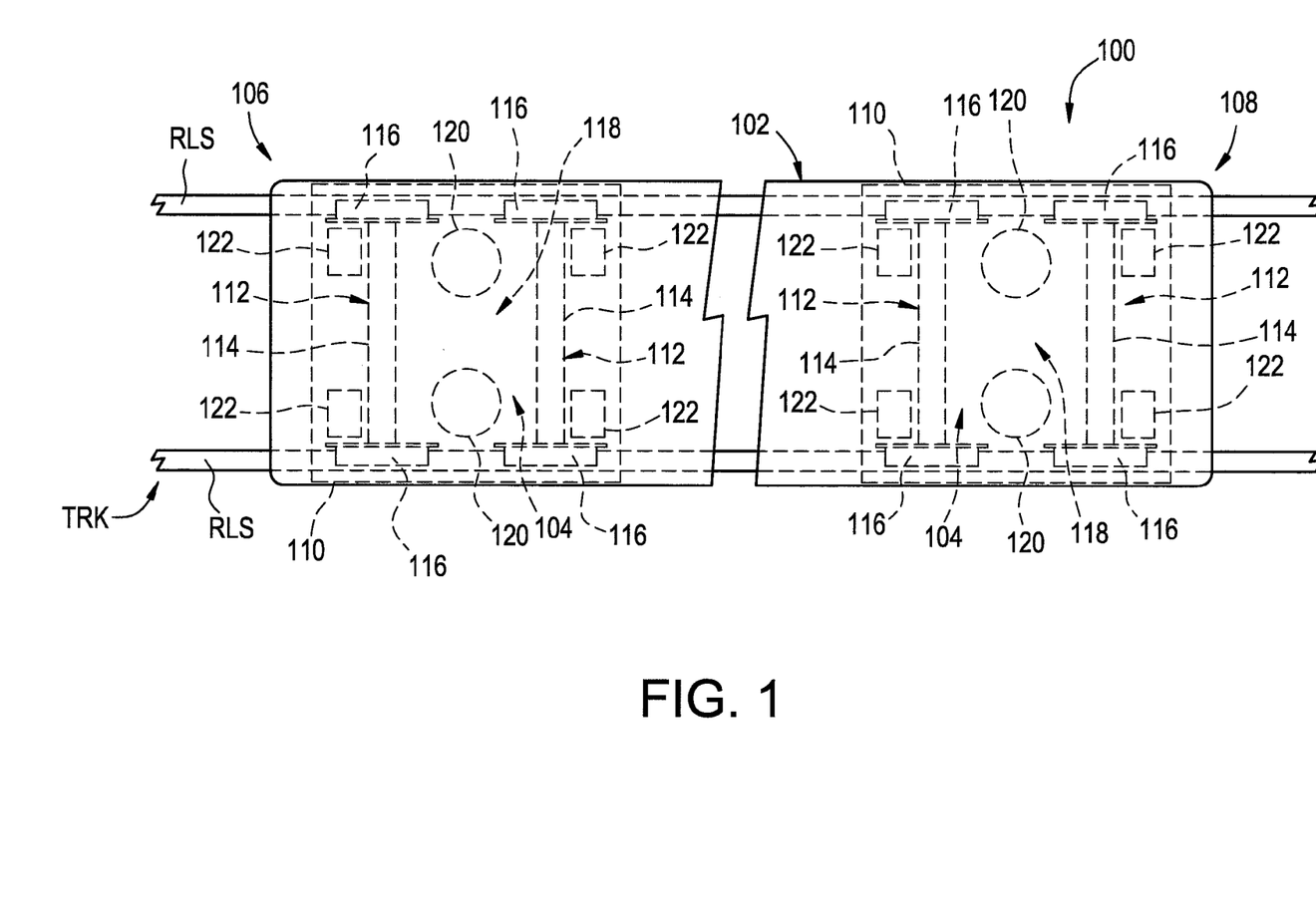
FIG. 1 is a schematic representation of one example of a rail vehicle including a suspension system in accordance with the subject matter of the present disclosure.

FIG. 1 illustrates one example of a vehicle including a suspension system in accordance with the subject matter of the present disclosure, such as a vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1 and 2, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
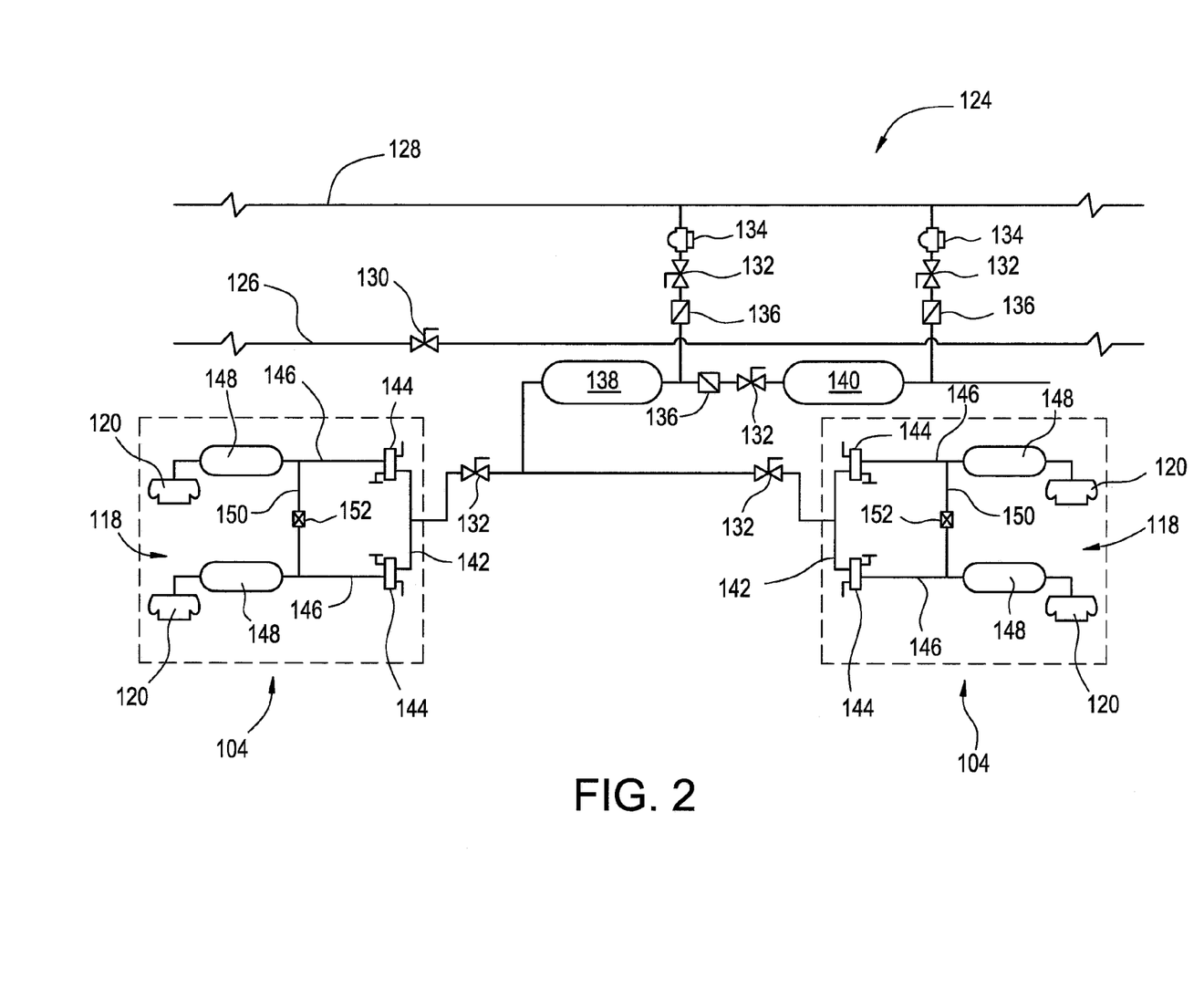
FIG. 2 is a schematic representation of one example of a pneumatic gas system operatively associated with the suspension system in FIG. 1.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-6. The gas spring assembly has a longitudinal axis AX and can include an end member 202, an end member 204 spaced longitudinally from end member 202 and a flexible sleeve 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIGS. 3-6, for example, end member 202 is secured on or along a structural component SC1, such as can represent associated vehicle body 102 in FIG. 1, for example, and can be secured thereon in any suitable manner. As another example, end member 204 is secured on or along a structural component SC2, such as can represent associated rail bogie 104 in FIG. 1, for example, and can be secured thereon in any suitable manner.

In the exemplary arrangement in FIGS. 3-6, end member 202 is shown as taking the form of a top plate having a plate wall 210 that has opposing surfaces 212 and 214 such that a plate height (not identified) is at least partially defined therebetween. Plate wall 210 is shown as being generally planar and extending outwardly to an outer periphery 216. In some cases, plate wall 210 can have a generally circular shape such that an outer peripheral surface 218 extending in a heightwise direction can have a generally cylindrical shape. A passage surface 220 can at least partially define a gas transfer passage 222 extending through the end member such that pressurized gas can be transferred into and out of spring chamber 208, such as by way of pneumatic system 124 (FIG. 2), for example. In some cases, the end member can include a projection or boss 224 that extends from along plate wall 210 in a longitudinal direction. In the exemplary arrangement shown in FIGS. 3 and 5, projection 224 extends axially outwardly away from spring chamber 208.

Figure 3:
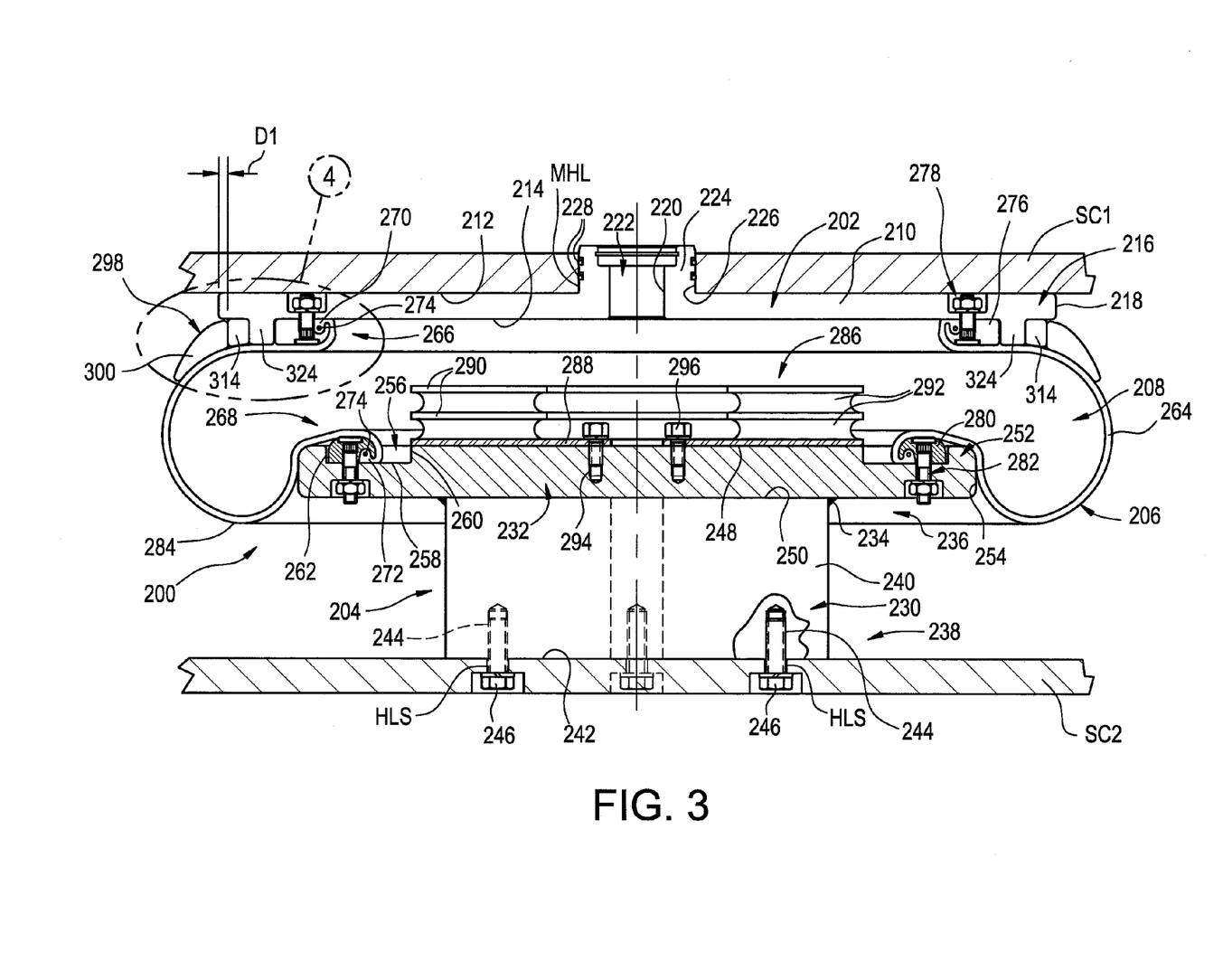
FIG. 3 is a side view, in partial cross-section, of one example of a gas spring assembly including a displaceably-mounted lateral support element in accordance with the subject matter of the present disclosure.
Figure 5:
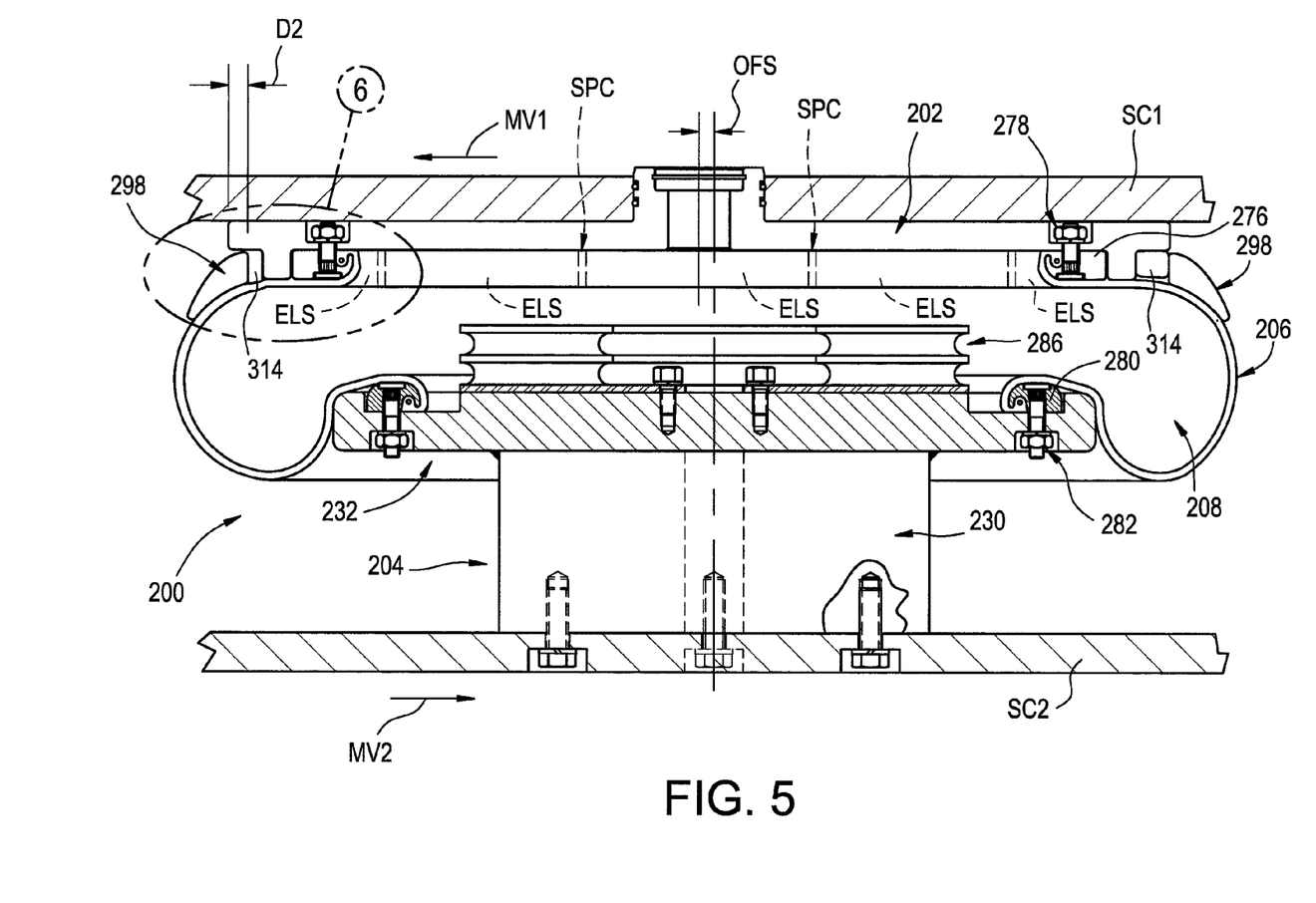
FIG. 5 illustrates the gas spring assembly and lateral support element in FIG. 3 in a laterally displaced condition.

As mentioned above, one or more securement devices (not shown) can be used to secure or otherwise interconnect the end members of the gas spring assembly with corresponding structural components. In some cases, projection 224 can include an outer surface 226 that is dimensioned for receipt within a passage or mounting hole MHL that extends through structural component SC1. Additionally, one or more sealing elements 228 can, optionally, be included that are disposed between or otherwise at least partially form a substantially fluid-tight connection between the end member and the structural component, such as between projection 224 and mounting hole MHL, for example. In some cases, structural component SC1 can, optionally, at least partially define an external reservoir suitable for storing a quantity of pressurized gas.

End member 204 is shown as taking the form of an assembly that includes a support base or pedestal 230 and a base plate 232 that is secured on or along the pedestal in a suitable manner, such as by way of a flowed-material joint 234, for example. Pedestal 230 extends axially between opposing ends 236 and 238, and includes an outer surface 240 that extends peripherally about axis AX and an end surface 242 that is disposed along end 238 and is dimensioned or otherwise configured for operative engagement with an associated structural component, such as structural component SC2, for example. It will be appreciated that end member 204 can be secured on or along the associated structural component in any suitable manner. As one example, pedestal 230 can include a plurality of securement features 244, such as threaded passages that extend inwardly into the pedestal from along end surface 242, for example. In some cases, a corresponding number of one or more holes or passages HLS can extend through structural component SC2 that are dimensioned for receipt of a securement device 246, such as a threaded fastener, for example. It will be appreciated, however, that other configurations and/or arrangements could alternately be used.

Base plate 232 can have a plate wall (not numbered) that has opposing surfaces 248 and 250 such that a plate height (not identified) is at least partially defined therebetween. Base plate 232 is shown as being generally planar and extending outwardly to an outer periphery 252. In some cases, base plate 232 can have a generally circular shape such that an outer peripheral surface 254 extending in a heightwise direction can have a generally cylindrical shape. Additionally, in some cases, base plate 232 can, optionally, include an endless annular recess or groove 256 that extends axially inwardly into the base plate from along surface 248 thereof. It will be appreciated that such a groove, if provided, can be of any suitable size, shape, configuration and/or arrangement. For example, groove 256 is shown as being at least partially defined by a bottom surface 258, an inner side surface 260 and an outer side surface 262. In a preferred arrangement, groove 256 can be dimensioned to at least partially receive a portion of flexible sleeve 206 and one or more retaining elements, such as may be used to secure an end of the flexible sleeve on or along the base plate, for example.

Flexible sleeve 206 can be of any suitable size, shape, construction and/or configuration. As one example, flexible sleeve 206 can include a flexible wall 264 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 264 is shown extending in a longitudinal direction between opposing ends 266 and 268. In some cases, flexible wall 264 can, optionally, include a mounting bead dispose along either one or both of ends 266 and 268. In the arrangement shown in FIGS. 3 and 4, mounting beads 270 and 272 are shown as being respectively disposed along ends 266 and 268. In some cases, the mounting beads can, optionally, include a reinforcing element, such as an endless, annular bead core 274, for example.

It will be appreciated, that the ends of flexible sleeve 206 can be secured on, along or otherwise interconnected between end members 202 and 204 in any suitable manner. As one example, gas spring assembly 200 can include one or more bead retaining elements that engage at least a portion of the flexible sleeve and maintain the flexible sleeve in substantially fluid-tight engagement with the corresponding end member (e.g., end member 202 and/or 204). In the arrangement shown in FIGS. 3 and 5, end 266 of flexible wall 264 is disposed in abutting engagement with surface 214 of plate wall 210 and end 268 of flexible wall 264 is disposed in abutting engagement with bottom surface 258 of groove 256 in base plate 232. It will be appreciated that the ends of the flexible sleeve can be secured on or along the surfaces of the end members in any suitable manner. As one example, a bead retaining element 276, such as in the form of an endless, annular ring, for example, can capture at least a portion of mounting bead 270 and can be secured on or along plate wall 210 in a suitable manner, such as by way of a plurality of securement devices 278, for example. In some cases, the securement devices could include threaded fastener (not numbered) and threaded nut (not numbered) combinations that extend through at least approximately aligned holes or slots (not numbered) in the base plate and in the bead retaining element.

As another example, a bead retaining element 280, such as in the form of an endless, annular ring, for example, can capture at least a portion of mounting bead 272 and can be secured on or along base plate 232 by way of a plurality of securement devices 282, for example. In some cases, the securement devices can include threaded fastener (not numbered) and threaded nut (not numbered) combinations that extend through at least approximately aligned holes or slots (not numbered) in the base plate and in the bead retaining element. Typically, securement devices 278 and/or 282 and the corresponding holes or openings are disposed in peripherally-spaced relation to one another at least partially around the associated end member (e.g., one of end members 202 and/or 204).

Typically, at least a portion of flexible sleeve 206 will extend radially outwardly beyond outer periphery 252 of base plate 232. In some cases, end member 204 can include an outer support wall (not shown) that can, optionally, extend peripherally around or otherwise along base plate 232, such as from along the plate wall of the base plate and in a direction toward end 240 of pedestal 230. In such cases, flexible sleeve 206 can extend along an outer surface (not shown) of the outer support wall such that a rolling lobe 284 is formed along the flexible sleeve. In some cases, the outer surface of the outer support wall, if provided, can have a generally cylindrical shape, and rolling lobe 284 can be displaceable along the outer surface as the gas spring assembly is axially displaced between extended and compressed conditions, such as may occur during dynamic use in operation. It will be appreciated, however, that other shapes and/or configurations of the outer support wall and/or the outer surface thereof can alternately be used, such as may be useful to provide desired performance characteristics, for example.

As is well known in the art, it is generally desirable to avoid or at least minimize contact between end members of a gas spring assembly, such as may occur due to variations in load conditions and/or upon deflation of the gas spring assembly, for example. As such, gas spring assembly 200 is shown in FIGS. 3 and 5 as including a jounce bumper 286 that is disposed within spring chamber 208 and supported on end member 204. Jounce bumper 286 is shown as including a mounting plate 288 that is disposed in abutting engagement with end member 204. Jounce bumper 286 also includes a plurality of rigid elements 290 and a plurality of compressive elements 292 that are fixedly attached to at least one of rigid elements 290. It will be appreciated that compressive elements 292 can be formed from any suitable material or combination of materials, such as natural rubber, synthetic rubber and/or thermoplastic elastomer, for example. Additionally the compressive elements can be fixedly secured on or along one or more of mounting plate 288 and/or rigid elements 290 in any suitable manner, such as by way of an adhesive and/or cured (e.g., vulcanized) joint or connection, for example.

It will be appreciated that jounce bumper 286 can be secured on or along an end member in any suitable manner. As identified in FIGS. 3 and 5, for example, base plate 232 of end member 204 is shown as including one or more securement features 294, such as may take the form of a plurality of threaded holes, for example. In such case, a corresponding number of one or more securement devices 296, such as one or more threaded fasteners, for example, can extend through one of a corresponding number of holes, openings or other features of the jounce bumper or a component thereof (e.g., mounting plate 288) to secure the jounce bumper on or along the end member.

Gas spring assembly 200 can also, optionally, include a complimentary component that may be dimensioned to or otherwise suitable for abuttingly engaging the jounce bumper or a component thereof (e.g., one of rigid elements 290). For example, gas spring assembly 200 can, optionally, include a bearing plate (not shown) disposed in abutting engagement along surface 214 of plate wall 210 and secured on or along end member 202. It will be appreciated that the bearing plate, if included, can be attached to the end member in any suitable manner. For example, plate wall 210 of end member 202 can include one or more securement features (not shown), such as threaded holes, for example, that as may be suitable for receiving a complimentary securement device (not shown), such as a threaded fastener, for example, to secure the bearing plate on or along the end member.

Gas spring assembly 200 can also include a lateral support element 298 that is displaceably supported on or along end member 202 in accordance with the subject matter of the present disclosure. Lateral support element 298 can be configured to engage a portion of flexible sleeve 206 during lateral movement of end member 202 relative to end member 204. Additionally, lateral support element 298 can be secured or otherwise supported on or along end member 202 such that the lateral support element can be displaced relative to the end member, such as may occur in response to forces or loads generated by the flexible wall (e.g., a portion of flexible wall 206) acting on or otherwise against lateral support element 298.

It will be appreciated that a lateral support element, such as lateral support element 298, for example, can be of any suitable size, shape, configuration and/or construction. For example, lateral support element 298 is shown as including an element wall 300 in the form of an endless, annular ring that includes an outer surface 302 and a support surface 304 disposed generally opposite the outer surface, as identified in FIG. 4. It will be appreciated that lateral support elements having support surfaces with cross-sectional profiles of a variety of shapes, sizes and configurations have been developed and are commonly used, such as may be suitable for contributing to certain lateral performance characteristics of a gas spring assembly, for example. As such, it will be appreciated that a support surface having a cross-sectional profile of any suitable size, shape and/or configuration could be used.

Element wall 300 extends radially between an inward or mounting portion 306 and an outward or support portion 308. Additionally, as shown in the cross-sectional profile in FIGS. 4 and 6, element wall 300 includes a mounting edge or surface 310 disposed along mounting portion 306 and a distal edge or surface 312 disposed along support portion 308. It will be appreciated that element wall 300 of lateral support element 298 can have any suitable cross-sectional shape and/or configuration. As one example, one or more of outer surface 302 and/or support surface 304 can have one or more profile portions and/or one or more curved profile portions. In the exemplary arrangement shown in FIGS. 3-6, for example, outer surface 302 and support surface 304 are shown as having curved cross-sectional profiles. It will be appreciated, however, that other configurations and/or arrangements could alternately be used.

Lateral support element 298 can be flexibly or otherwise displaceably secured on or along end member 202 in any suitable manner. As one example, one or more elastomeric mounting elements can operatively connect the lateral support element and the end member. In this manner, the lateral support element can be secured in a predetermined position and/or orientation along the end member while being capable of displacement relative to the end member, which displacement may result from forces and/or loads generated by the flexible sleeve on the lateral support element during lateral movement of the end members relative to one another.

Figure 4:
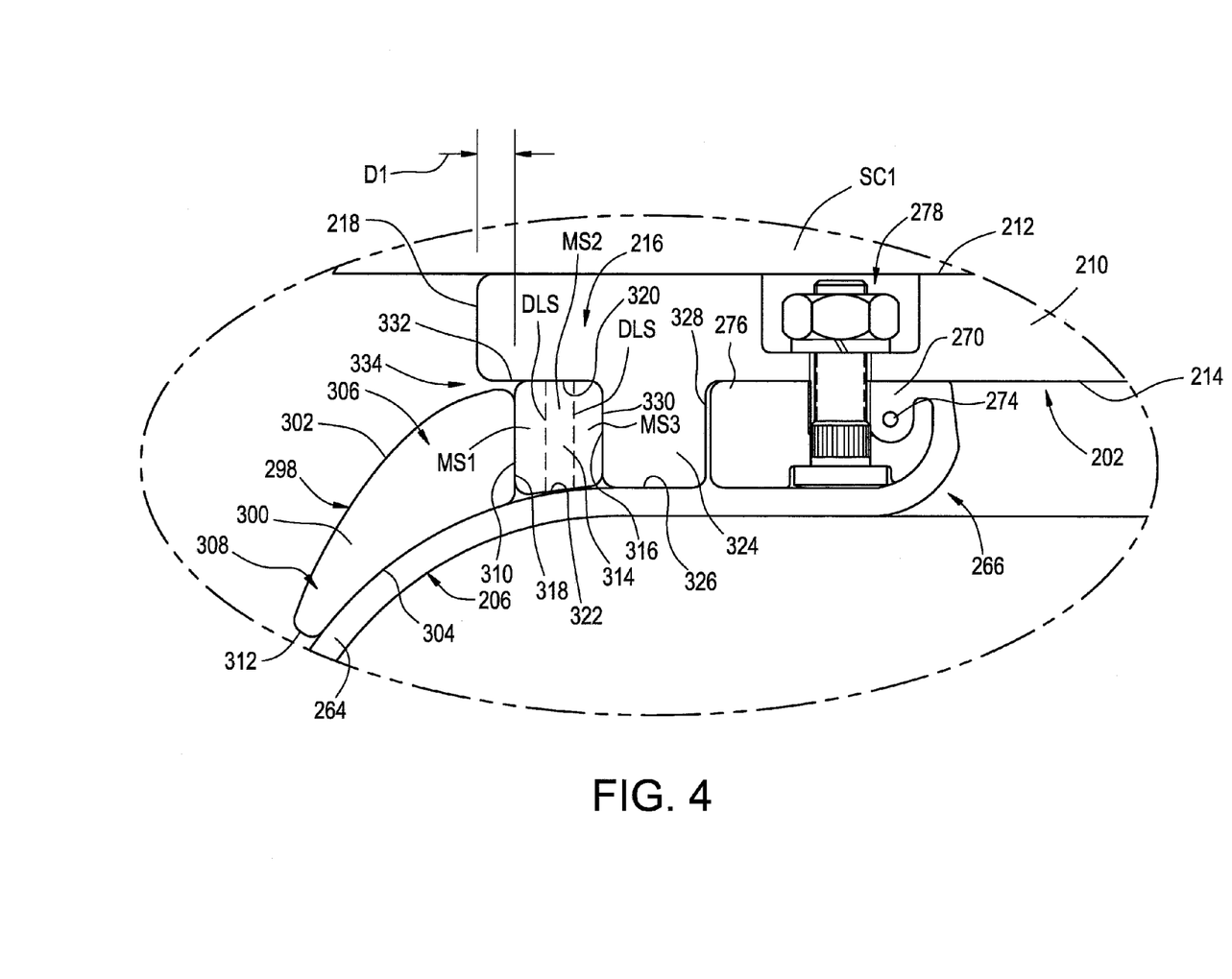
FIG. 4 is an enlarged view of the portion of the gas spring assembly and lateral support element that is identified as Detail 4 in FIG. 3.

It will be appreciated that the one or more elastomeric mounting elements can be of any suitable size, shape, configuration and/or arrangement, and can be formed from any suitable number of one or more element sections and/or components. As one example, the one or more elastomeric mounting elements can take the form of endless, annular rings that extend peripherally about axis AX. As another example, the one or more elastomeric mounting elements could take the form of split, annular rings that extend substantially entirely about axis AX. As a further example, the one or more elastomeric mounting elements could be formed from a plurality of element sections, such as, for example, are represented in by element sections ELS in FIG. 5 that extend between dashed edge lines (not identified) with spaces SPC disposed therebetween. In such case, element sections ELS can be disposed in peripherally-spaced relation to one another around or otherwise along the outer periphery of the end member. As yet another example, the elastomeric mounting element could be formed from an elongated length of elastomeric material that is helically wrapped about axis AX, such as is represented in FIG. 4 by material sections MS1-MS3, for example. As a further example, the one or more elastomeric mounting elements could take the form of one or more annular rings that are at least partially formed from elastomeric material and can be positioned between the end member and the lateral support element, such as are represented in FIG. 4 by material sections MS1-MS3, for example. In some cases, one or more annular rings formed from a comparatively rigid material can be disposed between two of the annular rings formed from elastomeric material, such as is represented in FIG. 4 by dashed lines DLS, for example.

Additionally, it will be appreciated that the one or more elastomeric mounting elements and/or any sections or components thereof can be of any suitable cross-sectional size and/or shape, such as a curvilinear (e.g., circular, oval) or a polygonal (e.g., square, rectangular, trapezoidal) cross-sectional shape, for example. Furthermore, it will be appreciated that the one or more elastomeric mounting elements can be formed from any suitable material or combination of materials. For example, the one or more elastomeric mounting elements, or components or sections thereof, could be formed substantially-entirely from an elastomeric material, such as a natural rubber, a synthetic rubber and/or a thermoplastic elastomer (e.g., polyurethane), for example. In other cases, the one or more elastomeric mounting elements could include one or more rigid or otherwise comparatively inelastic elements and/or components (not shown). Furthermore, the one or more elastomeric mounting elements can be operatively connected between the end member and the lateral support element in any suitable manner. As one example, the elastomeric mounting element could be attached or otherwise secured between opposing surfaces of the end member and the lateral support element by way of a flowed-material joint (e.g., an adhesive joint) and/or a cured-material joint (e.g., a connection in which uncured elastomeric material is vulcanized or otherwise cured in abutting engagement with the opposing surfaces).

As indicated above, the elastomeric mounting element can have a cross-sectional shape with any suitable number of one or more outer surfaces or outer surface portions. In the arrangement shown in FIGS. 3-6, an elastomeric mounting element 314 has an approximately rectangular cross-sectional shape with an inner side surface 316, an outer side surface 318, a mounting end surface 320 and an exposed end surface 322 that is disposed toward flexible sleeve 206 in an assembled condition of gas spring assembly 200. In some cases, exposed end surface 322 can be disposed at an obtuse angle relative to inner side surface 316 or outer side surface 318 such that the exposed end surface can more closely follow the contours of lateral support element 298 and/or otherwise provide axial support to flexible sleeve 206.

End member 202 can include any suitable number of one or more features and/or elements dimensioned or otherwise adapted to withstand lateral forces acting on or generated by lateral support element 298 and/or for operative connection with elastomeric mounting element 314. As one example, end member 202 can include an annular mounting wall 324 that project outwardly from along surface 214 to an end surface 326. Annular mounting wall 324 is shown as including an inner surface 328 disposed toward bead retaining element 276 and an outer surface 330 disposed toward elastomeric mounting element 314. A shoulder surface 332 can extend outwardly from along outer surface 330 in a direction toward outer peripheral surface 218, and can, in some cases, be disposed in approximate alignment with surface 214 of plate wall 210.

Figure 7:
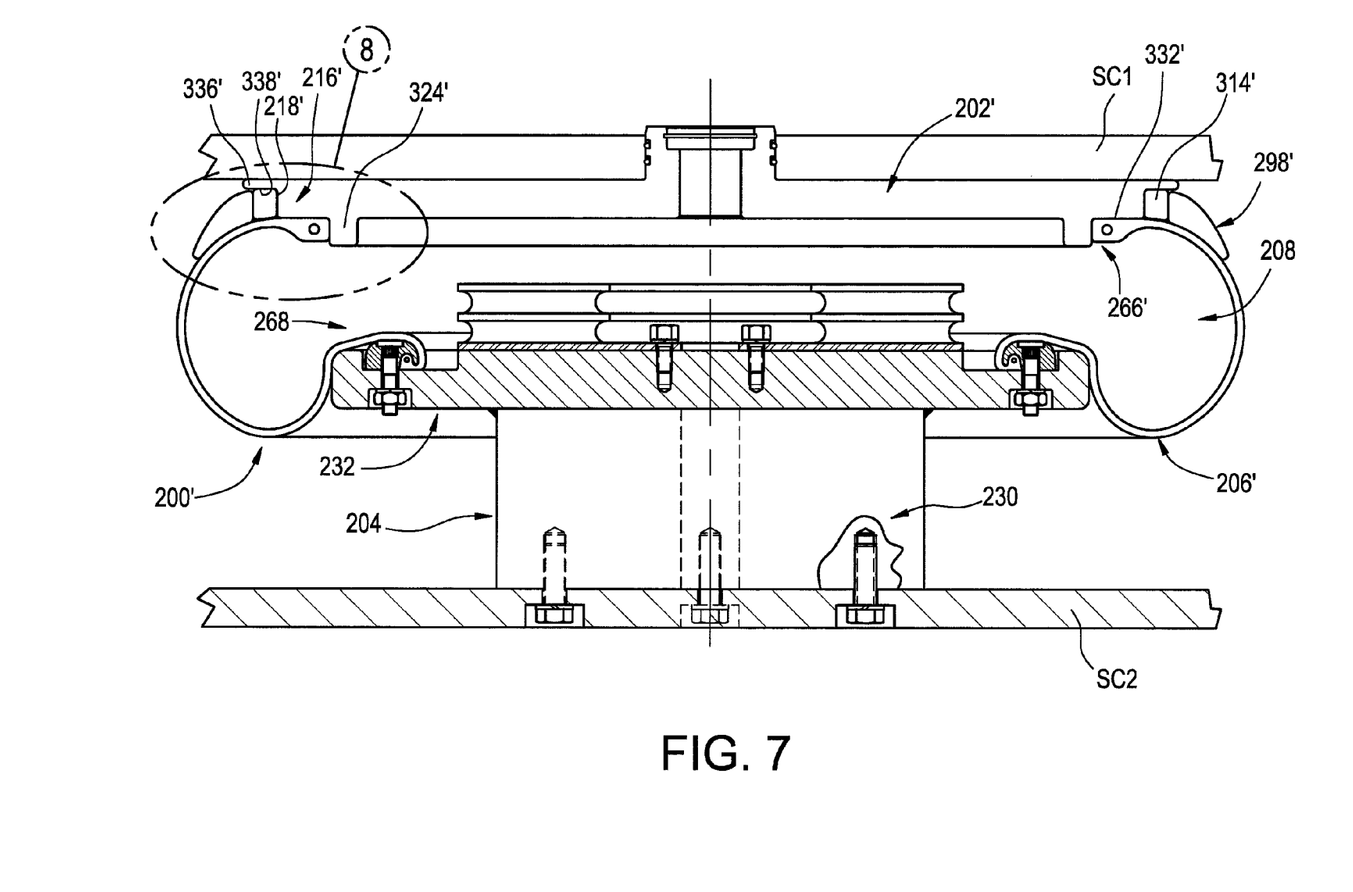
FIG. 7 is a side view, in partial cross-section, of another example of a gas spring assembly including a displaceably-mounted lateral support element in accordance with the subject matter of the present disclosure.
Figure 8:
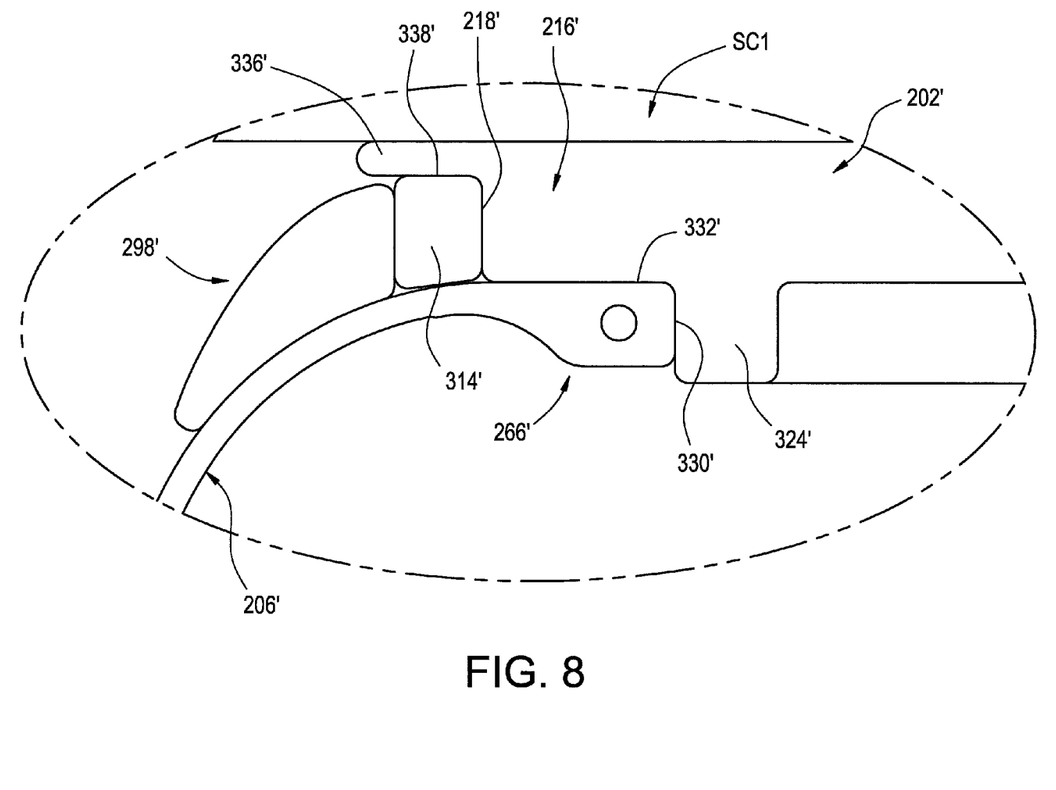
FIG. 8 is an enlarged view of the portion of the gas spring assembly and lateral support element that is identified as Detail 8 in FIG. 7.

Elastomeric mounting element 314 is shown as being attached to mounting surface 310 of lateral support element 298 as well as to outer surface 330 and/or shoulder surface 332 of end member 202. In some cases, lateral support element 298 can, optionally, be axially-positioned relative to shoulder surface 332 such that a gap 334 is formed in the axial direction between the end member and the lateral support element. In either of such constructions, lateral support element 298 can be displaceably secured to end member 202. It will be appreciated, however, that other configurations and/or arrangements could alternately be used. For example, FIGS. 7 and 8 illustrate an alternate arrangement in which gas spring assembly 200' includes an end member 202' adapted to receivingly engage an end 266' of a flexible sleeve 206' that is snap or friction fit onto an annular mounting wall 324' of the end member such that a substantially fluid-tight seal is formed therebetween. In such case, end 266' can be pressed or otherwise fit onto an outer surface 330' of the annular mounting wall until at least a portion of flexible wall 206' abuttingly engages a shoulder surface 332' of the end member.

End member 202' can also include an outer periphery 216' with an outer peripheral surface 218'. In some cases, end member 202' can include an outer flange wall 336' with a flange bottom surface 338' extending outwardly from along outer peripheral surface 218'. A lateral support element 298' can be secured on or along end member 202' using an elastomeric mounting element 314', such as in a manner similar to that described above in connection with end member 202 and lateral support element 298, such that lateral support element 298' can be displaced relative to end member 202', as described above.

It will be appreciated that end members 202 and 204 are shown in FIG. 3 in an approximately coaxial or aligned condition. In such a condition, lateral support element 298 may be disposed in a neutral or unbiased position (e.g., a position that is approximately coaxial or aligned with end member 202), which is represented in FIGS. 3 and 4 by reference dimension D1. Upon movement of end members 202 and 204 in a lateral direction relative to one another, as is represented by arrows MV1 and MV2 in FIG. 5, flexible sleeve engages a portion of lateral support element 298 disposed generally opposite the direction of arrow MV1. Such engagement between the flexible wall and the lateral support element can generate forces and/or loads on the lateral support element resulting in deformation of elastomeric mounting element 314 and displacement of lateral support element 298, such as is represented by reference dimensions D2 in FIGS. 5 and 6.

Figure 6:
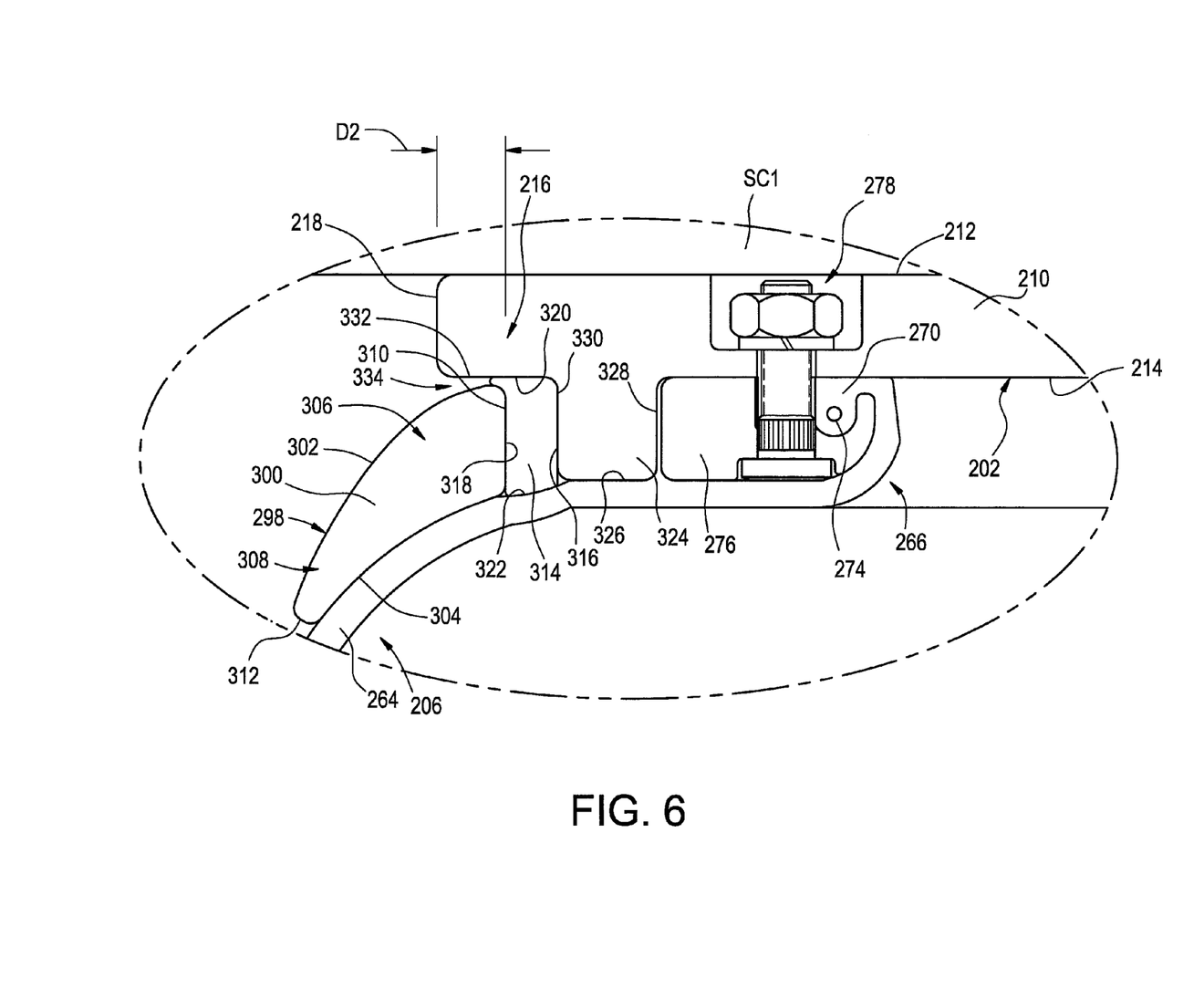
FIG. 6 is an enlarged view of the portion of the gas spring assembly and lateral support element that is identified as Detail 6 in FIG. 5.

Additionally, as end members 202 and 204 are laterally displaced relative to one another toward an offset or laterally-shifted condition, flexible wall 206 may, in some cases, separate from support surface 304 along or otherwise around a first circumferential portion of lateral support element 298. Additionally, as end members 202 and 204 are laterally displaced relative to one another toward an offset or laterally-shifted condition, flexible wall 206 will come into increased contact with support surface 304 along or otherwise around a second, different circumferential portion of lateral support wall 298. In many cases, the first and second circumferential portions of support surface 304 and/or lateral support element 298 will be disposed generally opposite one another.

Figure 9:
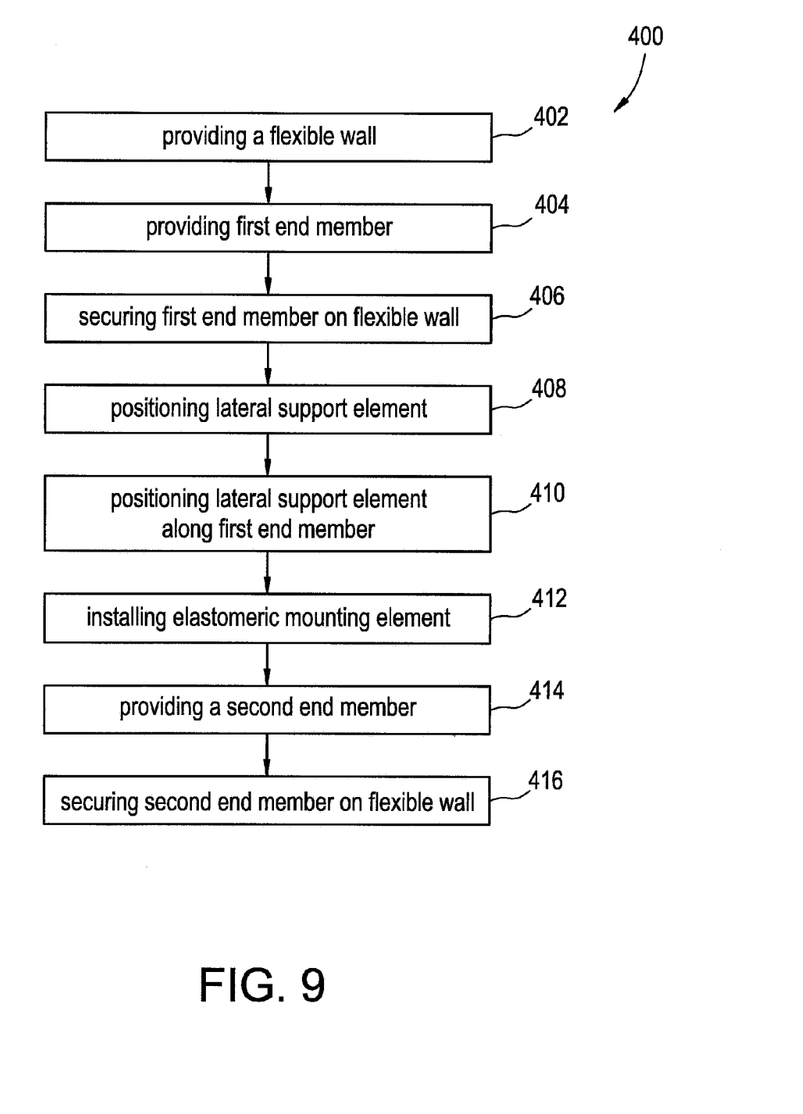
FIG. 9 is a graphical representation of one example of a method of manufacturing a gas spring assembly in accordance with the subject matter of the present disclosure.

One example of a method 400 of manufacturing a gas spring assembly in accordance with the subject matter of the present disclosure, such as one of gas spring assemblies 120 and/or 200, for example, is shown in FIG. 9 as including providing a flexible wall, such as flexible wall 264 of flexible sleeve 206, as is represented in FIG. 9 by item number 402. Method 400 also includes providing a first end member, such as end member 202, for example, as is represented by item number 404. Method 400 can further include securing a first end of the flexible wall on or along the first end member, as is represented that item number 406. Method 400 can also include providing a lateral support element, such as lateral support element 298, for example, as is represented in FIG. 9 by item number 408.

Method 400 can further include positioning the lateral support element on, along or otherwise adjacent the first end member, as is represented in FIG. 9 by item number 410. Method 400 can also include installing an elastomeric mounting element, such as elastomeric mounting element 314, for example, between the first end member and the lateral support element, such as is represented by item number 412. Method 400 can further include providing a second end member, such as end member 204, for example, as is represented by item number 414. Method 400 can further include securing the second end member on or along an end of the flexible wall to at least partially form a spring chamber, such as spring chamber 208, for example, as is represented in FIG. 9 by item number 416.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
   a flexible sleeve having a longitudinal axis and extending peripherally about said longitudinal axis between a first end and a second end spaced axially from said first end, said flexible sleeve including an outer surface and an inner surface at least partially defining a spring chamber;
   an end member disposed across said first end of said flexible sleeve and operatively secured thereto such that a substantially fluid-tight seal is formed with said end member along said first end of said flexible sleeve, said end member including an outer side surface extending axially therealong;
   a lateral support element disposed along said first end of said flexible sleeve adjacent said end member, said lateral support element including a support surface oriented transverse to said longitudinal axis that is dimensioned to abuttingly engage said outer surface of said flexible sleeve and an inner side surface oriented in approximate alignment with said longitudinal axis, said lateral support element positioned along said end member such that said inner side surface is disposed radially outward and axially co-extensive with said outer side surface of said end member and such that an annular gap extends therebetween; and,
   an elastomeric support element disposed within said annular gap and operatively connected between said outer side surface of said end member and said inner side surface of said lateral support element such that said inner side surface of said lateral support element is substantially radially isolated from said outer side surface of said end member by said elastomeric support element while said lateral support element remains displaceably supported along said first end of said flexible sleeve such that forces generated during lateral displacement of said first end of said flexible sleeve and said end member relative to said second end of said flexible sleeve can induce lateral movement of said lateral support element relative to said end member in a direction transverse to said longitudinal axis.

2. A gas spring assembly according to claim 1, wherein said elastomeric support element is at least partially formed from an elastomeric material including at least one of natural rubber, synthetic rubber and thermoplastic elastomer.

3. A gas spring assembly according to claim 2, wherein said elastomeric support element is formed as an endless annular ring extending peripherally about said longitudinal axis.

4. A gas spring assembly according to claim 2, wherein said elastomeric support element is at least partially formed from an elongated length of said elastomeric material wound helically about said longitudinal axis.

5. A gas spring assembly according to claim 2, wherein said elastomeric support element includes a plurality of support element sections disposed in peripherally spaced relation to one another about said longitudinal axis.

6. A gas spring assembly according to claim 2, wherein said elastomeric support element includes a plurality of annular element rings formed from said elastomeric material and at least one annular element ring formed from a comparatively rigid material and disposed between two of said plurality of annular element rings formed from said elastomeric material.

7. A gas spring assembly according to claim 1, wherein said elastomeric support element includes a first side surface portion and a second side surface portion facing opposite said first side surface portion with said first side surface portion disposed along said outer side surface of said end member and said second side surface portion disposed along said inner side surface of said lateral support element.

8. A gas spring assembly according to claim 7, wherein said elastomeric support element includes a first end surface portion disposed toward said end member and a second end surface portion disposed opposite said first end surface portion and facing away from said end member.

9. A gas spring assembly according to claim 8, wherein at least one of said first side surface portion and said first end surface portion is attached to said end member.

10. A gas spring assembly according to claim 8, wherein at least one of said second side surface portion and said second end surface portion is attached to said lateral support element.

11. A gas spring assembly according to claim 1, wherein said lateral support element has a longitudinal axis and is at least partially defined by an element wall extending peripherally about said longitudinal axis, said element wall having a cross-sectional profile including a support profile section that at least partially forms said support surface and an outer profile section that at least partially defines an outer surface of said lateral support element facing opposite said support surface.

12. A gas spring assembly according to claim 11, wherein said cross-sectional profile of said element wall includes a mounting profile section that at least partially defines said inner side surface extending between said support and outer surfaces.

13. A gas spring assembly according to claim 12, wherein said cross-sectional profile of said element wall includes a distal profile section disposed radially outward of said mounting profile section that at least partially defines an outer peripheral edge of said lateral support element.

14. A suspension system comprising:
 a pressurized gas system including a pressurized gas source and a control device; and,
 at least one gas spring assembly according to claim 1 disposed in fluid communication with said pressurized gas source through said control device.

15. A gas spring assembly according to claim 1, wherein said end member includes an outer peripheral surface with said outer side surface spaced radially inward of said outer peripheral surface such that at least a portion of said elastomeric support element is disposed radially inward of said outer peripheral surface of said end member.

16. A gas spring assembly according to claim 15, wherein said inner side surface of said lateral support element is disposed radially inward of said outer peripheral surface of said end member such that a portion of said lateral support element radially overlaps said end member in at least a neutral position of said lateral support element relative to said end member.

17. A method of manufacturing a gas spring assembly, said method comprising:
 providing a flexible sleeve having a longitudinal axis and extending peripherally about said longitudinal axis between a first end and a second end spaced axially from said first end, said flexible sleeve including an outer surface and an inner surface capable of at least partially defining a spring chamber;
 providing an end member that includes an outer side surface extending axially therealong and positioning said end member across said first end of said flexible sleeve;
 forming a substantially fluid-tight seal between said end member and said flexible sleeve;
 providing a lateral support element that includes a support surface dimensioned to abuttingly engage said outer surface of said flexible sleeve and an inner side surface oriented transverse to said support surface and defining an innermost periphery of said lateral support element;
 supporting said lateral support element along said first end of said flexible sleeve adjacent said end member such that said inner side surface is disposed radially outward and axially co-extensive with said outer side surface of said end member to at least partially define an annular gap between said inner and outer side surfaces;
 providing an elastomeric support element that is at least partially formed from an elastomeric material including at least one of natural rubber, synthetic rubber and thermoplastic elastomer;
 positioning said elastomeric support element at least partially within said annular gap between said end member and said lateral support element; and,
 attaching said elastomeric support element to said end member and said lateral support element such that said inner side surface of said lateral support element is substantially radially isolated from said outer side surface of said end member by said elastomeric support element while forces generated during lateral displacement of said first end of said flexible sleeve and said end member relative to said second end of said flexible sleeve can induce lateral movement of said lateral support element relative to said end member in a direction transverse to said longitudinal axis.

18. A method according to claim 17, wherein providing said elastomeric support element includes one of:
 forming said elastomeric support element as an endless annular ring extending peripherally about said longitudinal axis;
 forming said elastomeric support element from an elongated length of said elastomeric material wound helically about said longitudinal axis;
 forming said elastomeric support element from a plurality of support element sections disposed in peripherally spaced relation to one another about said longitudinal axis; and, forming said elastomeric support element from a plurality of annular element rings formed from said elastomeric material and from at least one annular element ring formed from a comparatively rigid material with said at least one annular element ring formed from said comparatively rigid material disposed between two of said plurality of annular element rings formed from said elastomeric material.

19. A method according to claim 17, wherein providing said elastomeric support element includes providing a quantity of uncured elastomeric material, and attaching said lateral support element to said end member using said elastomeric support element includes positioning said uncured elastomeric material between said lateral support element and said end member and curing said uncured material to form said elastomeric support element.

20. A gas spring assembly comprising:
 a flexible sleeve having a longitudinal axis and extending peripherally about said longitudinal axis between a first end and a second end spaced axially from said first end, said flexible sleeve including an outer surface and an inner surface at least partially defining a spring chamber;
 an end member disposed across said first end of said flexible sleeve and operatively secured thereto such that a substantially fluid-tight seal is formed with said end member along said first end of said flexible sleeve;
 a lateral support element disposed along said first end of said flexible sleeve adjacent said end member, said lateral support element including a support surface dimensioned to abuttingly engage said outer surface of said flexible sleeve; and,
 an elastomeric support element at least partially formed from an elastomeric material including at least one of natural rubber, synthetic rubber and thermoplastic elastomer, said elastomeric support element including a plurality of annular element rings formed from said elastomeric material and at least one annular element ring formed from a comparatively rigid material and disposed between two of said annular element rings, said elastomeric support element operatively connecting said lateral support element and said end member such that said lateral support element is displaceably supported along said first end of said flexible wall such that forces generated during lateral displacement of said first end of said flexible sleeve and said end member relative to said second end of said flexible sleeve can induce lateral movement of said lateral support element relative to said end member in a direction transverse to said longitudinal axis.

* * * * *